(12) United States Patent
Satoh

(10) Patent No.: US 6,562,116 B1
(45) Date of Patent: May 13, 2003

(54) INK FOR BALL-POINT PEN AND BALL-POINT PEN USING THE SAME

(75) Inventor: Atsushi Satoh, Gunma (JP)

(73) Assignee: Mitsubishi Pencil Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/786,622

(22) PCT Filed: Sep. 3, 1999

(86) PCT No.: PCT/JP99/04800
§ 371 (c)(1), (2), (4) Date: Mar. 5, 2001

(87) PCT Pub. No.: WO00/14168
PCT Pub. Date: Mar. 16, 2000

(30) Foreign Application Priority Data

Sep. 4, 1998 (JP) ............................................ 10-251307
Jan. 27, 1999 (JP) ............................................ 11-018098

(51) Int. Cl.$^7$ ............................................... C09D 11/00
(52) U.S. Cl. ............................... 106/31.58; 106/31.86; 106/31.49; 106/31.78
(58) Field of Search .......................... 106/31.58, 31.86, 106/31.49, 31.78

(56) References Cited

U.S. PATENT DOCUMENTS

| | | | | |
|---|---|---|---|---|
| 4,490,177 A | * | 12/1984 | Shioi et al. ................. | 106/1.05 |
| 5,062,890 A | * | 11/1991 | Miyashita et al. ......... | 106/31.75 |
| 5,466,281 A | * | 11/1995 | Hanke et al. .............. | 106/31.37 |
| 5,969,003 A | * | 10/1999 | Foucher et al. ........... | 106/31.27 |
| 5,977,211 A | * | 11/1999 | Koyama .................... | 106/31.13 |
| 6,048,914 A | * | 4/2000 | Goto et al. ................ | 106/31.57 |
| 6,354,756 B1 | * | 3/2002 | Morita ........................ | 401/192 |
| 6,409,408 B2 | * | 6/2002 | Koyama ..................... | 401/209 |

FOREIGN PATENT DOCUMENTS

| | | | | |
|---|---|---|---|---|
| JP | 60186573 A | * | 9/1985 | |
| JP | 5271602 A | * | 10/1993 | |
| JP | 06009916 A | * | 1/1994 | |
| JP | 08048930 A | * | 2/1996 | |

* cited by examiner

Primary Examiner—Elizabeth D. Wood
Assistant Examiner—Veronica F. Faison
(74) Attorney, Agent, or Firm—Darby & Darby

(57) ABSTRACT

An ink for a ball point comprising at least one organic solvent selected from the group consisting of alcohols and glycol ethers, a resin and a colorant, wherein the spectral reflectance determined in the state where the ink for a ball point pen is filled into an ink reservoir has a maximum value in 500 to 520 nm, and a ratio of maximum strength/minimum strength of the spectral reflectance is 2.2 to 5.5. Further provided is a ball point pen equipped with a transparent ink reservoir charged with the ink, wherein the color of the ink can visually be identified through a part which transmits light in the ball point pen barrel.

8 Claims, 1 Drawing Sheet

Spectral Reflectance Through Polypropylene Tube

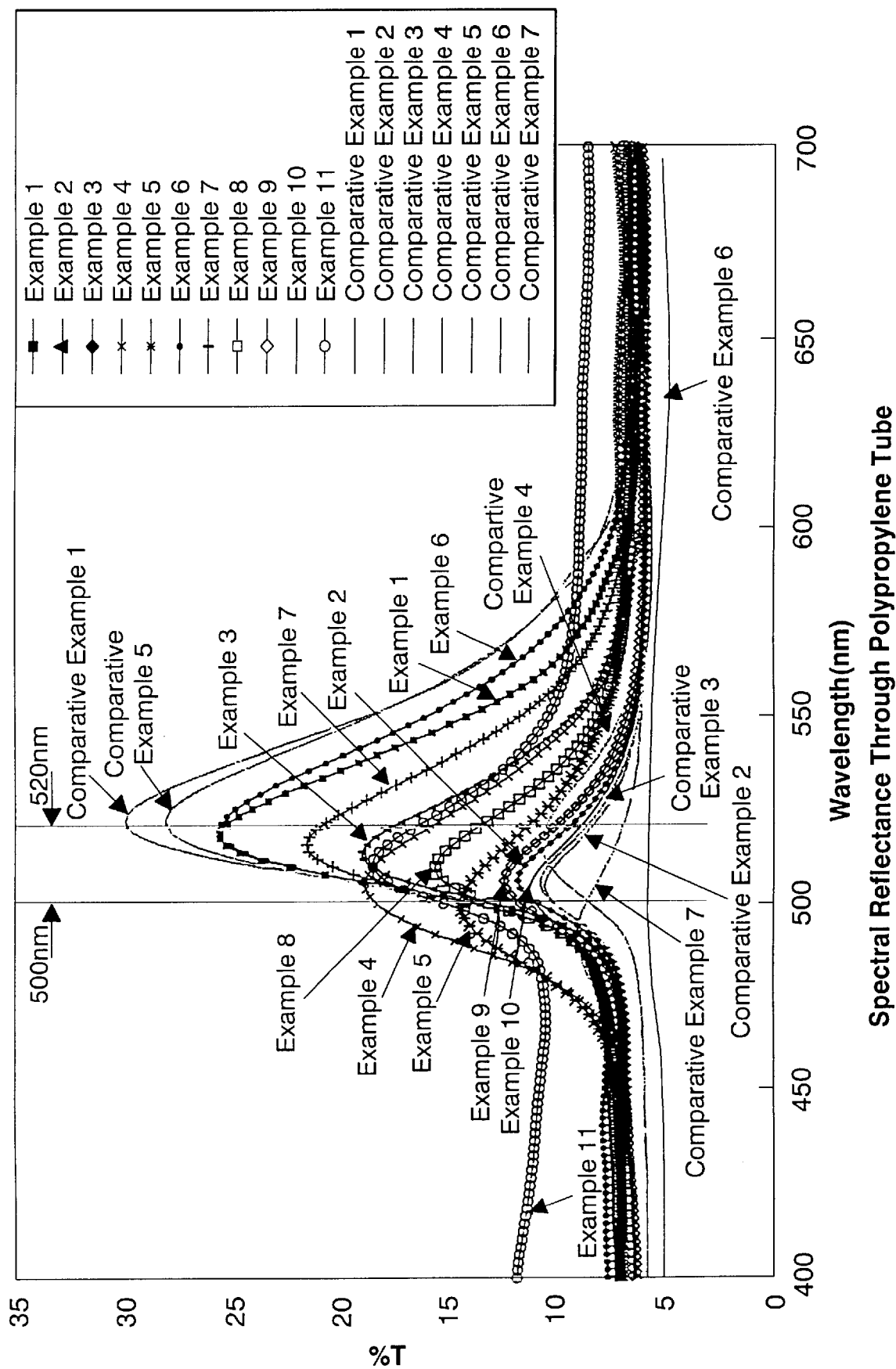

INK FOR BALL-POINT PEN AND BALL-POINT PEN USING THE SAME

TECHNICAL FIELD

The present invention relates to an oil based green ink for a ball point pen and a ball point pen. More specifically, it relates to an oil based green ink for a ball point pen the color of which can be identified from the outside when it is filled into a transparent ink reservoir, and a ball point pen using the same.

BACKGROUND ART

In oil based green inks for a ball point pen, a green color tone has so far been obtained by toning with a blue dye and a yellow dye. In such case, in a ball point pen using an oil based ink whose ink reservoir has a diameter of about 3.5 mm or less, the visual color in the state where the ink is filled into the ink reservoir has a tone close to a nearly black color due to a small amount of the ink filled, and it is practically impossible to identify what color ink is filled thereinto from the outside of the ink reservoir. Further, there has been a problem that when the drawn lines thereby are spread by solvents and chemicals, a blue color and a yellow color are eluted and the green drawn lines disappear.

It has been recognized that a pigment is preferably used for improving durability thereof and, for example, a phthalocyanine green pigment giving a green color tone by itself is preferably used. However, in the case of a ball point pen using an oil based ink, a colorant in the ink has to be compounded in a larger amount as compared with that for, for example, markers, and therefore a visual color of the ink in which a phthalocyanine green pigment is dispersed in a high concentration is darkened and close to a nearly black color.

It is effective for obtaining a stable dispersion system in which the phthalocyanine green pigment is dispersed in a high concentration to treat the surface of the phthalocyanine green pigment with phthalocyanine pigment derivatives, and such method is widely used. However, dispersions of the phthalocyanine green pigment which is subjected to surface treatment with the phthalocyanine pigment derivatives have a darkened visual color due to an effect of the surface treating agents and are close to a black color. Accordingly, there has been a problem that a visual color of an ink using the above dispersion has been darkened as well and is close to a black color and it is difficult to observe a green color of the ink through a transparent or translucent ink reservoir and a transparent or translucent barrel of the ball point pen.

The present invention has been made in light of the problems described above, and an object thereof is to provide an oil based green ink for a ball point pen the color of which can be identified by visual observation through a transparent ink reservoir and a part of the barrel in the ball point pen which transmits light, and a ball point pen using the same.

DISCLOSURE OF THE INVENTION

Intensive researches conducted by the present inventors in order to solve the problems described above have resulted in finding that use of an ink in which a spectral reflectance (%) determined in the state where the ink is filled into an ink reservoir has a maximum value in a specific wavelength range and in which a ratio of maximum strength/minimum strength of the spectral reflectance falls in a specific range makes it possible to identify a color of the ink by visual observation through the transparent ink reservoir and the transparent barrel of the ball point pen. Thus, the present invention has been completed.

That is, the oil based green ink for a ball point pen of the present invention is characerized by comprising at least one organic solvent selected from the group consisting of alcohols and glycol ethers, a resin and a colorant, wherein the spectral reflectance determined in the state where the ink for a ball point pen is filled into an ink reservoir has a maximum value in a wavelength range of 500 to 520 nm, and a ratio of maximum strength/minimum strength of the spectral reflectance is 2.2 to 5.5.

The ball point pen of the present invention is characterized by using the oil based greenink for a ball point pen described above.

BRIEF DESCRIPTION OF THE DRAWINGS

FIG. 1 is a spectrum chart of a spectral reflectance of an ink filled into a translucent tube.

BEST MODE FOR CARRYING OUT THE INVENTION

The embodiment of the present invention shall be explained below in detail.

In the oil based green ink for a ball point pen of the present invention, the spectral reflectance determined in the state where the ink for a ball point pen is filled into an ink reservoir has a maximum value in 500 to 520 nm in a wavelength range of 400 to 700 nm, and a ratio of maximum strength/minimum strength of the spectral reflectance is 2.2 to 5.5 Accordingly, the ink for a ball point pen of the present invention can be recognized to have a green color and is used as a green ink for a ball point pen.

If the spectral reflectance has a maximum value of less than 500 nm, the ink can not be identified to have a desired green color by visual observation and is close to a black color. On the other hand, if it has a maximum value exceeding 520 nm, the ink looks yellowish green by visual observation, and the drawn lines have a pale yellowish green color, so that when letters are written on white paper, they are illegible.

Even if the spectral reflectance has a maximum value falling in a range of 500 to 520 nm, the visual color is darkened if a ratio of maximum strength/minimum strength is less than 2.2. On the other hand, if it exceeds 5.5, the visual color becomes yellowish green.

The spectral reflectance described above can be determined by conventional methods using various types of a spectrophotometer.

The colorant used in the present invention shall not specifically be restricted as long as the ink for a ball point pen of the present invention is colored green in combination with a yellow pigment and a blue dye or green pigment and includes pigments and dyes which are usually used for inks for a writing instrument and inks for a coating material.

The pigment includes inorganic pigments and organic pigments. The pigment may be used as it is or, for example, in the form of a processed pigment prepared by subjecting it to surface treatment in a production stage of the pigment or a dispersed toner.

To be specific, it includes blue pigments such as Pigment Blue 2, Pigment Blue 9, Pigment Blue 15:1, Pigment Blue 15:2, Pigment Blue 15:3, Pigment Blue 15:4, Pigment Blue 15:6, Pigment Blue 16, Pigment Blue 17 Pigment Blue 19, Pigment Blue 24, Pigment Blue 27, Pigment Blue 28, Pigment Blue 29 and Pigment Blue 35, green Pigments such as Pigment Green 4, Pigment Green 7, Pigment Green 8, Pigment Green 10, Pigment Green 12, Pigment Green 18, Pigment Green 19, Pigment Green 21, Pigment Green 36 and Pigment Green 50, and phthalocyanine pigments such as phthalocyanine green.

The phthalocyanine pigments may be subjected to surface treatment with phthalocyanine pigment derivatives in a production stage of the pigments.

All known phthalocyanine gree pigments can be used for the phthalocyanine green and include, for example, chlorinated copper phthalocyanine and brominated copper phthalocyanine. To be specific, they include, for example, Chromofine Green 2GN, Chromofine Green 5301, Chromofine Green 5370, Chromofine Cyanine Green 2GN, Dainichi Cyanine Green 537, Dainichi Cyanine Green FG and Dainichi Cyanine Green FGH (the above manufactured by Dainichiseika Color & Chemicals MFG. Co., Ltd.), Fastogen Green 5005, Fastogen Green 5710, Fastogen Green B, Fastogen Green S, Fastogen Green SF, Fastogen Green SO and Fastogen Green 2YK (the above manufactured by Dainippon Ink and Chemicals Inc.), Heliogen Green 8680, Heliogen Green 8681K, Heliogen Green 8682T, Heliogen Green 8730, Heliogen Green 8730K, Heliogen Green 9360, Heliogen Green A, Heliogen Green D 8730, Heliogen Green G, Heliogen Green GA, Heliogen Green GN, Heliogen Green GNA, Heliogen Green GTA, Heliogen Green GV, Heliogen Green GWS, Heliogen Green K 8730, Heliogen Green K 9360, Heliogen Green L 8730, Heliogen Green L 9140, Heliogen Green L 9361, Fastogen Green MY, Fastogen Green YCN, Heliogen Green 6G, Heliogen Green 6GA, Heliogen Green 8GA and Heli Fast Green GT (the above manufactured by BASF AG.), Irgalite Fast Brilliant Green 3GL, Irgalite Fast Brilliant Green GL, Irgalite Green GLN and Irgalite Green 6G (the above manufactured by Ciba Specialty Chemicals Co., Ltd.), Liofast Green B 237, Lionol Green B 201, Lionol Green Y 102, Lionol Green YS 07, Lionol Green 2Y301, Lionol Green 2YS, Lionol Green 6YK and Lionol Green 6YKPCN (the above manufactured by Toyo Ink MFG. Co., Ltd.), Polymon Green FBH, Polymon Green FGH, Polymon Green G, Polymon Green GN, Polymon Green GN 500 and Polymon Green 6G (the above manufactured by Polymon Developments Ltd.), and Sanyo Cyanine Green, Sanyo Phthalocyanine Green F 6G, Sanyo Phthalocyanine Green FB, Sanyo Phthalocyanine Green FB pure, Sanyo Phthalocyanine Green 6YS and SAX (pigment) (the above manufactured by Sanyo Color works, Ltd.).

The dye is used for controlling a color tone of the ink of the present invention and the drawn line intensity, and any of conventional blue dyes and yellow dyes used for an oil based ink for a ball point pen can be used and include, for example, spirit-soluble dyes.

Specific examples of the spirit-soluble dyes include, for example, Savinyl Blue GLS (manufactured by Sandoz Co., Ltd.) and Spilon Blue GLSH special (SPT Blue 26), Spilon Yellow C-GNH and SBN Yellow 530 (the above manufactured by Hodogaya Chemical Co., Ltd.).

These colorants may be used alone or in suitable combination of two or more kinds thereof. A content of the colorant shall not specifically be restricted and can suitably be decided according to combination of a colorant and an organic solvent used. It is suitably selected from a range of 5 to 60% by weight, preferably 6 to 45% by weight based on the total amount of the ink for a ball point pen of the present invention.

Further in addition to the colorants described above, a yellow pigment is used in combination as a colorant for the oil based green ink for a ball-point pen of the present invention.

All known yellow pigments can be used for the yellow pigment, and they may be those subjected to surface treatment with surfactants or yellow pigment derivatives in a production stage of the yellow pigments.

The yellow pigment includes, for example, Pigment Yellow 1, Pigment Yellow 3, Pigment Yellow 12, Pigment Yellow 13, Pigment Yellow 14, Pigment Yellow 16, Pigment Yellow 17, Pigment Yellow 55, Pigment Yellow 74, Pigment Yellow 81, Pigment Yellow 83, Pigment Yellow 93, Pigment Yellow 94, Pigment Yellow 95, Pigment Yellow 97, Pigment Yellow 109, Pigment Yellow 110, Pigment Yellow 120, Pigment Yellow 128, Pigment Yellow 138, Pigment Yellow 147, Pigment Yellow 151, Pigment Yellow 154, Pigment Yellow 155, Pigment Yellow 167, Pigment Yellow 185 and Pigment Yellow 191. To be more specific, it includes Paliotol Yellow 2140HD, Sicopal Yellow L1100, Sicopal Yellow L1110, Sicotan Yellow L1912, Sicomin Yellow L1622, Sicomin Yellow L1630S, Sicomin Yellow L1635S, Sicotrans Yellow L1916, Sico Yellow 1252HD, Paligen Yellow L1482, Paligen Yellow L1560, Paliotol Yellow D1155 and Paliotol Yellow L0960HD (the above manufactured by BASF AG.), Horna Chrome Yellow GMXAH-15, Horna Chrome Yellow GMXAH-35, Horna Chrome Yellow GU-15-SQ, Irgazin Yellow GO, Irgazin Yellow 2RLT, Irgazin Yellow 2GLTE, Irgazin Yellow 3RLTN and Irgazin Yellow 5GLT (the above manufactured by Ciba Specialty Chemicals Co., Ltd.), Bayferrox 915, Bayferrox 920, Bayferrox 3420, Bayferrox 3910 and Bayferrox 3920 (the above manufactured by Bayer AG.), Novoperm Yellow F2G, Novoperm Yellow H2G, Hostaperm Yellow H3G, Hostaperm Yellow H4G, Hostaperm Yellow H6G and Hostaperm Yellow HR70 (the above manufactured by Hoechst AG.), Pigment Yellow 1425, Pigment Yellow 1450, Pigment Yellow 1707, Pigment Yellow 1710, Pigment Yellow 1711, Pigment Yellow 1717, Pigment Yellow 8104, Light Fast Pigment Yellow R and Pigment Yellow (the above manufactured by Sanyo Color Works, Ltd.), SEIKA FAST YELLOW 10GH, SEIKA FAST YELLOW A-3, SEIKA FAST YELLOW 2035, SEIKA FAST YELLOW 2054, SEIKA FAST YELLOW 2200, SEIKA FAST YELLOW 2270, SEIKA FAST YELLOW 2300, SEIKA FAST YELLOW 2400(B), SEIKA FAST YELLOW 2500, SEIKA FAST YELLOW 2600, SEIKA FAST YELLOW 2700(B), SEIKA FAST YELLOW 2770 and SEIKA FAST YELLOW ZAY-260 (the above manufactured by Dainichiseika Color & Chemicals MFG. Co., Ltd.), and Sandrin Yellow 4G, Novoperm Yellow FGL, Novoperm Yellow H10G01, HANSA Yellow 10G, PV Fast Yellow HGR, PV Fast Yellow H2G-01 and permanent Yellow NCG (the above manufactured by Clariant Co., Ltd.). These yellow pigments may be used alone or in suitable combination of two or more kinds thereof.

Among the yellow pigments described above, particularly preferred are the yellow pigments which are opaque and have an average particle diameter of 80 nm or more, preferably 80 to 400nm which is determined by a laser diffraction method or under an electron microscope. They include, for example, Pigment Yellow 1425, Pigment Yellow 1450, Pigment Yellow 1707, Pigment Yellow 1710, Pigment Yellow 1711, Pigment Yellow 1717 and Pigment Yellow 8104 (the above manufactured by Sanyo Color Works, Ltd.), Irgazin Yellow 2GLTE (manufactured by Ciba Specialty Chemicals Co., Ltd.), PV Fast Yellow HGR, PV Fast Yellow H2G-01, Novoperm Yellow H10G01, Permanent Yellow NCG and Sandrin Yellow 4G (the above manufactured by Clariant Co., Ltd.) and Paliotol Yellow L0960HD (manufactured by BASF AG.). They may be used alone or in suitable combination of two or more kinds thereof.

A content of the yellow pigment in the oil based green ink for a ball point pen of the present invention shall not specifically be restricted and may be an amount meeting a dispersion force of the colorant or an amount. suited to a desired concentration thereof. Too much amount makes the ink yellowish green, and too small amount makes it a dark color, so that the content is suitably selected from a range of 0.1 to 60 parts by weight, preferably 0.5 to 45 parts by weight per s00 parts by weight of the ink for a ball point pen of the present invention as long as the properties of the ink for a ball point pen of the present invention are not damaged.

Any of acid type derivatives and base type derivatives can be used for the pigment derivative. Specific examples of the pigment derivatives include Solsperse 5000, Solsperse 12000 and Solsperse 22000 (the above manufactured by Zeneca Co., Ltd.) and EFKA 745 and EFKA 6750 (manufactured by EFKA CHEMICALS B. V.). They may be used alone or in suitable combination of two or more kinds thereof.

The organic solvent used in the present invention shall not specifically be restricted as long as it is a solvent usually used for inks for a ball point pen and includes those which dissolve or disperse the colorants and have a relatively high boiling point.

The organic solvent includes at least one selected from the group consisting of alcohols and glycol ethers.

The alcohols include, for example, aromatic alcohols such as benzyl alcohol and 2-phenoxyethanol and polyhydric alcohols such as ethylene glycol, diethylene glycol, propylene glycol, dipropylene glycol, trimethylene glycol and glycerin.

The glycol ethers include, for example, diethylene glycol monomethyl ether, diethylene glycol monoethyl ether, diethylene glycol monopropyl ether, diethylene glycol monobutyl ether, dipropylene glycol monobutyl ether, tripropylene glycol monomethyl ether, tripropylene glycol monobutyl ether, propylene glycol monophenyl ether, ethylene glycol monomethyl ether, ethylene glycol monoethyl ether, ethylene glycol monopropyl ether, ethylene glycol monobutyl ether, ethylene glycol monohexyl ether, ethylene glycol mono-2-ethylhexyl ether, ethylene glycol dimethyl ether, ethylene glycol dibutyl ether, diethylene glycol dimethyl ether, diethylene glycol diethyl ether, diethylene glycol dibutyl ether, triethylene glycol dimethyl ether, tetraethylene glycol dimethyl ether, propylene glycol monomethyl ether, propylene glycol monoethyl ether, propylene glycol monompropyl ether, propylene glycol monobutyl ether, propylene glycol mono-t-butyl ether, dipropylene glycol monomethyl ether, triethylene glycol monobutyl ether, tetraethylene glycol monobutyl ether, ethylene glycol mono-2-ethylbutyl ether, 3-methyl-3-methoxy-1-butanol, diethylene glycol methyl ethyl ether, diethylene glycol monohexyl ether and diethylene glycol monoethylhexyl ether.

These organic solvents may be used alone or in suitable combination of two or more kinds thereof.

A blending amount of the organic solvent is suitably selected from a range of 20 to 70 parts by weight, preferably 40 to 60 parts by weight per 100 parts by weight of the ink for a ball point pen of the present invention.

If the blending amount is less than 20 parts by weight, the colorant and the other substances added are inferior in solubility, and therefore it is not preferred. On the other hand, if it exceeds 70 parts by weight, the colorant is relatively short, and the concentration is reduced, so that it is not preferred as well.

The resin used in the present invention is used in order to control a viscosity of the ink and shall not specifically be restricted as long as it is a resin usually used for inks for a ball point pen. It includes, for example, ketone resins, sulfonamide resins, maleic acid resins, ester gums, xylene resins, alkyd resins, phenol resins, rosin resins, polyvinylpyrrolidone, polyvinylbutyral resins, and modified products thereof.

These resins may be used alone or in suitable combination of two or more kinds thereof.

A content of the resin contained in the ink for a ball point pen of the present invention is suitably selected from a range of 1 to 40 parts by weight, preferably 5 to 30 parts by weight per 100 parts by weight of the ink for a ball point pen of the present invention.

If the content is less than 1 part by weight, the minimum viscosity required for the ink is not obtained, and therefore it is not preferred from such point of view. On the other hand, if it exceeds 40 parts by weight, a viscosity of the resulting ink becomes too high, and therefore it is not preferred as well.

When a pigment is used for the colorant, a dispersant and a pigment derivative may be used, if necessary, for the ink for a ball point pen of the present invention for the purpose of dispersing the pigment.

The dispersant includes, for example, polyvinyl butyral resins, Solsperse 13240, Solsperse 20000, Solsperse 24000, Solsperse 26000, Solsperse 28000, Solsperse 32550 and Solsperse 34750 (the above manufactured by Zeneca Co., Ltd.), EFKA 44, EFKA 46, EFKA 47, EFKA 48, EFKA 54, EFKA 63, EFKA 64, EFKA 65, EFKA 66, EFKA 71, EFKA 120, EFKA 150, EFKA 745, EFKA 780, EFKA 781, EFKA 903, EFKA 906, EFKA 909, EFKA 4009, EFKA 5010, EFKA 5207, EFKA 5224, EFKA 6750, EFKA LP4008, EFKA LP4010, EFKA LP4050, EFKA LP4055, EFKA Polymer 400, EFKA Polymer 401, EFKA Polymer 402, EFKA Polymer 403, EFKA Polymer 451, EFKA Polymer 452, EFKA Polymer 453, EFKA N and EFKA Uvalink ADP (the above manufactured by EFKA CHEMICALS B. V.), Ajisper P801, Ajisper PN411, Ajisper PA111, Ajisper PB711, Ajisper PB811 and Ajisper PB821 (the above manufactured by Ajinomoto Co.,Inc.), and Disperbyk 101, Disperbyk 108, Disperbyk 110, Disperbyk 111, Disperbyk 130, Disperbyk 160, Disperbyk 161, Disperbyk 162, Disperbyk 163, Disperbyk 164, Disperbyk 166, Disperbyk 170, BYK 220S, Anti-Terra U and Lactimon (the above manufactured by Bic Chemie Japan Co., Ltd.). They may be used alone or in suitable combination of two or more kinds thereof.

An optimum amount of the dispersant is suitably decided.

The dispersant and the pigment derivative each described above are suitably selected depending on the combination of the pigment, the organic solvent and the colorant used, and the optimum amounts of the dispersant and the pigment derivative contained in the ink for a ball point pen of the present invention are suitably decided as well.

Other components than those described above may be added, if necessary, to the ink for a ball point pen of the present invention as long as the properties of the ink for a ball point pen are not damaged. The components which can be added may be any ones as long as they are usually used for inks for a ball point pen and include, for example, fatty acids, surfactants, rust preventives, antioxidants, fungicides, pH controllers and lubricants.

The ink for a ball point pen of the present invention can be produced by various known methods which have so far been carried out.

That is, it can readily be obtained, for example, by blending the respective components described above and mixing them with stirring by means of a stirrer such as a dissolver or mixing and pulverizing them by means of a ball mill, a three roll mill, a bead mill or sand mill and then removing coarse particles of the pigments, undissolved substances and mixed solids by means of centrifugation and filtration.

The ink for a ball point pen of the present invention is usable at a viscosity falling in a wide range of 20,000 mPa·s or less, preferably 10 to 10,000 mPa·s at 25° C., and the viscosity is preferably controlled suitably by such blending amounts of the resin and the organic solvent as described above according to a case where the colorant used is a dye or a pigment.

The ink for a ball point pen of the present invention thus obtained can be recognized to have a green color and is used as a green ink for a ball point pen.

The ink for a ball point pen of the present invention is preferably used as an oil based ink for a ball point pen. Further, the ink for a ball point pen of the present invention can be used for a ball point pen and the like.

A material for the ink reservoir used in the present invention may be any one as long as it has durability without being deformed or swollen by the charged ink for a ball point pen of the present invention and is transparent to such an extent that light is transmitted and the charged amount and the color of the ink can be observed. Specific examples of the material for the ink reservoir include, for example, thermoplastic resins such as polypropylene, polyethylene, polyacrylonitrile base thermoplastic resins, polyethylene terephthalate, polyarylates and ethylene-vinyl alcohol copolymers. In particular, polypropylene is inexpensive and has transparency and suitable strength and hardness, and therefore it is suited.

In the ball point pen according to the present invention, at least a part of a barrel of the ball point pen preferably transmits light.

As described above, in the oil based green ink for a ball point pen of the present invention, the spectral reflectance determined in the state where the ink for a ball point pen is filled into an ink reservoir has a maximum value in 500 to 520 nm in a wavelength range of 400 to 700 nm, and a ratio of maximum strength/minimum strength of the spectral reflectance is 2.2 to 5.5. Accordingly, it has become possible to identify the color of the ink from the outside of the ink reservoir with charging the ink into the ink reservoir which is made of a transparent material including polypropylene and which transmits light. Thus, in the ball point of the present invention in which an ink reservoir is charged with the ink for a ball point pen described above, use of a barrel at least a part of which transmits light makes it possible to identify the color of the ink from the outside of the ball point pen in the state where the barrel is loaded with the ink reservoir charged with the ink described above.

EXAMPLES

The present invention shall be explained below in further details with reference to examples and comparative examples, but the present invention shall by no means be restricted by the examples.

When a pigment was used for the colorant, it was dispersed in advance by means of a conventional method, for example, a ball mill or a three roll mill and then used.

The following tests were carried out for the inks for a ball point pen obtained in the examples and the comparative examples.

1. Measurement of Spectral Reflectance

The inks prepared in the examples and the comparative examples were charged into a thin translucent tube which was made of polypropylene and had an outer diameter of 3 mm and an inner diameter of 1.6 mm, and the spectral reflectance was determined on the following conditions by means of a spectrophotometer U3300 equipped with a 150φ integrating sphere for U3300 (manufactured by Hitachi, Ltd.). The eight sample tubes were loaded parallel in a bundle in order to be equipped closely to the measuring window of 20 mmφ of the integrating sphere.

Measuring Conditions:

Data mode: % T

Scanning speed: 600 nm/min.

Wavelength range: 700.00 to 400.00 nm

Slit: 5.0 nm

Base line calibration: aluminum oxide plate

Sampling interval: 2 nm

Subsidiary white plate: aluminum oxide plate

2. Evaluation Tests

The translucent tubes charged with the inks described above were subjected to various evaluation tests carried out by 20 monitors.

(1) Visual Color Test

The translucent tubes charged with the inks were subjected to an identification test of a color under a D65 standard light source F65D-A type (manufactured by Suga Test Instruments Co., Ltd.).

(2) Drawn Line Color Test

The translucent tubes charged with the inks were set in barrels of ball point pens, and the resulting ball point pens were used to write on blank PPC paper (copying paper) to evaluate colors of the drawn lines.

Example 1

A green ink for a ball point pen was prepared under the following composition:

| | |
|---|---|
| Pigment Yellow (C.I. No. PY14, manufactured by Sanyo Color Works, Ltd. | 15.1 parts by weight |
| Savinyl Blue GLS (manufactured by Sandoz Co., Ltd.) | 4.9 parts by weight |
| 2-Phenoxyethanol | 42.5 parts by weight |
| Benzyl alcohol | 16 parts by weight |
| Hilac 110H (ketone resin manufactured by Hitachi Chemical Co., Ltd.) | 15 parts by weight |
| Polyvinyl butyral (S-leck B BL-1 manufactured by Sekisui Chemical Co., Ltd.) | 4 parts by weight |
| Oleic acid | 2 parts by weight |

Example 2

A green ink for a ball point pen was prepared in the same manner as in Example 1, except that the blending amounts of Pigment Yellow and Savinyl Blue GLS were changed respectively to 17.9 parts by weight and 2.1 parts by weight.

Example 3

A green ink for a ball point pen was prepared in the same manner as in Example 1, except that the blending amount of Pigment Yellow was changed to 6.5 parts by weight, and 13.5 parts by weight of FGN pure (phthalocyanine blue pigment, manufactured by Sanyo Color Works, Ltd.) was substituted for 4.9 parts by weight of Savinyl Blue GLS.

Example 4

A green ink for a ball point pen was prepared in the same manner as in Example 1, except that 14.3 parts by weight of Irgazin Yellow 2GLTE (C. I. No. PY109, manufactured by Ciba Specialty Chemicals Co., Ltd.) was substituted for 15.1 parts by weight of Pigment Yellow, and the blending amount of Savinyl Blue GLS was changed to 5.7 parts by weight.

Example 5

A green ink for a ball point pen was prepared in the same manner as in Example 1, except that 14.3 parts by weight of Irgazin Yellow 2GLTE was substituted for 15.1 parts by weight of Pigment Yellow, and 5.7 parts by weight of FGN pure was substituted for 4.9 parts by weight of Savinyl Blue GLS.

Comparative Example 1

A green ink for a ball point pen was prepared in the same manner as in Example 1, except that the blending amounts of Pigment Yellow and Savinyl Blue GLS were changed respectively to 16.1 parts by weight and 3.9 parts by weight.

Comparative Example 2

A green ink for a ball point pen was prepared in the same manner as in Example 1, except that the blending amounts of Pigment Yellow and Savinyl Blue GLS were changed respectively to 1.5 parts by weight and 18.5 parts by weight.

Comparative Example 3

A green ink for a ball point pen was prepared in the same manner as in Example 1, except that the blending amount of Pigment Yellow was changed to 4.3 parts by weight, and 15.7 parts by weight of FGN pure was substituted for 4.9 parts by weight of Savinyl Blue GLS.

Comparative Example 4

A green ink for a ball point pen was prepared in the same manner as in Example 1, except that the blending amount of Pigment Yellow was changed to 8 parts by weight, and 12 parts by weight of VALIFAST GREEN (dye, manufactured by Orient Chemical Ind., Ltd.) was substituted for 4.9 parts by weight of Savinyl Blue GLS.

Example 6

A green ink for a ball point pen was prepared under the following composition:

| | |
|---|---|
| Phthalocyanine green (C.I. No. PG7, derivative-treated pigment) | 6.7 parts by weight |
| Pigment Yellow (C.I. No. PY14) | 13.3 parts by weight |
| 2-Phenoxyethanol | 42.5 parts by weight |
| Benzyl alcohol | 16 parts by weight |
| Hilac 110H (ketone resin manufactured by Hitachi Chemical Co., Ltd.) | 15 parts by weight |

-continued

| | |
|---|---|
| Polyvinyl butyral | 4 parts by weight |
| Polyvinylpyrrolidone | 0.5 part by weight |
| Oleic acid | 2 parts by weight |

Example 7

A green ink for a ball point pen was prepared in the same manner as in Example 6, except that the blending amounts of phthalocyanine green and Pigment Yellow were changed respectively to 10 parts by weight and 10 parts by weight.

Example 8

A green ink for a ball point pen was prepared in the same manner as in Example 6, except that the blending amounts of phthalocyanine green and Pigment Yellow were changed respectively to 16 parts by weight and 4 parts by weight.

Example 9

A green ink for a ball point pen was prepared in the same manner as in Example 6, except that the blending amounts of phthalocyanine green and Pigment Yellow were changed respectively to 18 parts by weight and 2 parts by weight.

Example 10

A green ink for a ball point pen was prepared in the same manner as in Example 6, except that the blending amounts of phthalocyanine green and Pigment Yellow were changed respectively to 19 parts by weight and 1 part by weight.

Example 11

A green ink for a ball point pen was prepared under the following composition:

| | |
|---|---|
| Pigment Yellow 1425 (yellow pigment, manufactured by Sanyo Color Works, Ltd. | 9.5 parts by weight |
| FGN pure (phthalocyanine blue pigment, manufactured by Sanyo Color Works, Ltd.) | 9 parts by weight |
| 2-Phenoxyethanol | 40 parts by weight |
| Benzyl alcohol | 13 parts by weight |
| Solsperse 24000 (manufactured by Zeneca Co., Ltd.) | 5.5 parts by weight |
| Solsperse 12000 (manufactured by Zeneca Co., Ltd.) | 1 part by weight |
| Hilac 110H (ketone resin manufactured by Hitachi Chemical Co., Ltd.) | 20 parts by weight |
| Oleic acid | 2 parts by weight |

Comparative Example 5

A green ink for a ball point pen was prepared in the same manner as in Example 6, except that the blending amounts of phthalocyanine green and Pigment Yellow were changed respectively to 5 parts by weight and 15 parts by weight.

Comparative Example 6

A green ink for a ball point pen was prepared in the same manner as in Example 6, except that the blending amounts of phthalocyanine green and Pigment Yellow were changed respectively to 20 parts by weight and 0 part by weight.

Comparative Example 7

A green ink for a ball point pen was prepared under the following composition:

| | |
|---|---|
| Savinyl Yellow RLS | 7 parts by weight |
| Savinyl Blue GLS | 28 parts by weight |
| 2-Phenoxyethanol | 38 parts by weight |
| Benzyl alcohol | 15 parts by weight |
| Polyvinylpyrrolidone (PVP K30) | 6 parts by weight |
| Polyvinylpyrrolidone (PVP K90) | 1 part by weight |
| Oleic acid | 5 parts by weight |

Shown in Table 1 are the measurement results of the spectral reflectances of the inks prepared in Examples 1 to 11 and Comparative Examples 1 to 7; the spectra (spectral reflectances—wavelength) are shown in FIG. 1; and the results of the evaluation tests are shown in Table 2. Consideration to Table 1, Table 2 and FIG. 1

It can be found from the results shown in Table 1 and FIG. 1 that in the inks for a ball point pen of the present invention obtained in Examples 1 to 11, the spectral reflectance determined in a rage of 400 to 700 nm has a maximum value in 500 to 520 nm, and a ratio of maximum strength/minimum strength of the spectral reflectance is 2.2 to 5.5 which falls in the scope of the present invention. In contrast with this, the inks for a ball point pen obtained in Comparative Examples 1 to 7 fall outside the scope of the present invention.

Further, it can be found from the results shown in Table 2 that the inks for a ball point pen of the present invention obtained in Examples 1 to 11, can visually be observed to be the green inks from the outside of the ink reservoir, and the drawn lines can be identified as well to have a green color. In contrast with this, in the inks for a ball point pen obtained in Comparative Examples 2 to 4 and 6 to 7, a visual color observed from the outside of the ink reservoir is close to a black color, and it has been difficult to identify what color of the inks is charged. Further, the inks for a ball point pen obtained in Comparative Examples 1 and 5 give drawn lines having a pale yellowish green color and bring about the defect that the letters are not legible in writing on white paper.

In view of the above, it can be found that distinctly excellent are the oil based green inks for a ball point pen of the present invention and the ball point pen of the present invention in which ink reservoirs are charged with the above inks for a ball point pen.

INDUSTRIAL APPLICABILITY

The color of the ink of the present invention can visually be identified from the outside of the ink reservoir in the state where the ink is filled into the ink reservoir, and it is useful as an oil based green ink for a ball point pen.

The color of the ink in a ball point pen in which the ink reservoir is charged with this ink not only can visually be identified from the outside of the ink reservoir but also can visually be identified from the outside through the barrel of the ball point pen in which the above ink reservoir is equipped. In addition thereto, lines drawn with the ball point pen of the present invention have the same color as the visual color.

TABLE 1

| | Example | | | | | | | | | | |
|---|---|---|---|---|---|---|---|---|---|---|---|
| | 1 | 2 | 3 | 4 | 5 | 6 | 7 | 8 | 9 | 10 | 11 |
| Peak position | 518 | 506 | 514 | 506 | 500 | 520 | 516 | 510 | 506 | 504 | 510 |
| Maximum strength (1) | 25.12 | 10.69 | 18.29 | 18.14 | 13.43 | 25.15 | 20.97 | 14.67 | 11.34 | 10.11 | 17.76 |
| Minimum strength (2) | 4.59 | 4.49 | 4.92 | 4.48 | 5.56 | 5.28 | 5.11 | 5.28 | 4.58 | 4.24 | 7.26 |
| (1)/(2) ratio | 5.47 | 2.38 | 3.72 | 4.05 | 2.42 | 4.76 | 4.11 | 2.78 | 2.48 | 2.39 | 2.44 |

| | Comparative Example | | | | | | |
|---|---|---|---|---|---|---|---|
| | 1 | 2 | 3 | 4 | 5 | 6 | 7 |
| Peak position | 522 | 504 | 506 | 516 | 522 | 506 | 490 |
| Maximum strength (1) | 29.65 | 9.40 | 9.60 | 9.56 | 27.74 | 4.49 | 7.88 |
| Minimum strength (2) | 4.71 | 4.49 | 4.40 | 4.39 | 5.51 | 3.48 | 4.67 |
| (1)/(2) ratio | 6.30 | 2.09 | 2.18 | 2.18 | 5.04 | 1.29 | 1.69 |

Peak position: position of the maximum value in the spectral reflectance
Maximum strength (1): maximum strength (% T) in the spectral reflectance
Minimum strength (2): minimum strength (% T) in the spectral reflectance

TABLE 2

| | Answer to visual color | | | | Answer to drawn line color | |
|---|---|---|---|---|---|---|
| | Green | Black | Pale yellowish green | unknown | Green | Pale yellowish green |
| Example 1 | 20 | 0 | 0 | 0 | 18 | 2 |
| Example 2 | 18 | 0 | 0 | 2 | 20 | 0 |
| Example 3 | 20 | 0 | 0 | 0 | 20 | 0 |
| Example 4 | 20 | 0 | 0 | 0 | 20 | 0 |
| Example 5 | 20 | 0 | 0 | 0 | 20 | 0 |

TABLE 2-continued

|  | Answer to visual color | | | | Answer to drawn line color | |
|---|---|---|---|---|---|---|
|  | Green | Black | Pale yellowish green | unknown | Green | Pale yellowish green |
| Example 6 | 20 | 0 | 0 | 0 | 19 | 1 |
| Example 7 | 20 | 0 | 0 | 0 | 19 | 1 |
| Example 8 | 20 | 0 | 0 | 0 | 20 | 0 |
| Example 9 | 19 | 0 | 0 | 1 | 20 | 0 |
| Example 10 | 19 | 0 | 0 | 1 | 20 | 0 |
| Example 11 | 17 | 0 | 0 | 3 | 20 | 0 |
| Comparative Example 1 | 9 | 0 | 11 | 0 | 1 | 19 |
| Comparative Example 2 | 0 | 18 | 0 | 2 | 20 | 0 |
| Comparative Example 3 | 0 | 17 | 0 | 3 | 20 | 0 |
| Comparative Example 4 | 1 | 17 | 0 | 2 | 20 | 0 |
| Comparative Example 5 | 7 | 0 | 13 | 0 | 1 | 19 |
| Comparative Example 6 | 0 | 19 | 0 | 1 | 20 | 0 |
| Comparative Example 7 | 0 | 20 | 0 | 0 | 20 | 0 |

*Numerical value shown in the table shows the number of persons
1) Answer to the visual color test carried out in the evaluation test (1)
2) Answer to the drawn line color test carried out in the evaluation test (2)

What is claimed is:

1. An oil based green ink for a ball point pen comprising
   (a) at least one organic solvent selected from the group consisting of alcohols and glycol ethers,
   (b) a resin,
   (c) a yellow pigment, and
   (d) at least one colorant selected from the group consisting of a blue dye and a green pigment,
wherein the spectral reflectance determined in the state where said ink for a ball point pen is filled into an ink reservoir has a maximum value in a wavelength range of 500 to 520 nm, and a ratio of maximum strength/minimum strength of the spectral reflectance is 2.2 to 5.5.

2. The oil based green ink for a ball point as described in claim 1, which contains at least phthalocyanine green as the green pigment.

3. A ball point pen equipped with an ink reservoir charged with the oil based green ink for a point pen as described in claim 1.

4. The ball point pen as described in claim 3, wherein the ink reservoir comprises polypropylene.

5. The ball point pen as described in claim 4, wherein the ink reservoir transmits light.

6. The ball point pen as described in claim 4, wherein at least a part of a barrel of the ball point pen in which the ink reservoir is equipped transmits light.

7. The ball point pen as described in claim 5, wherein at least a part of a barrel of the ball point pen in which the ink reservoir is equipped transmits light.

8. The ball point pen as described in claim 3, wherein at least a part of a barrel of the ball point pen in which the ink reservoir is equipped transmits light.

* * * * *